United States Patent [19]

Inoue et al.

[11] Patent Number: 5,192,364
[45] Date of Patent: Mar. 9, 1993

[54] PRIMER COMPOSITIONS

[75] Inventors: Yoshifumi Inoue; Kin Saito, both of Annaka; Keisuke Imai, Tomioka; Masatoshi Arai, Annaka, all of Japan

[73] Assignee: Shin-Etsu Chemical Co., Ltd., Tokyo, Japan

[21] Appl. No.: 720,727

[22] Filed: Jun. 25, 1991

[30] Foreign Application Priority Data

Jun. 26, 1990 [JP] Japan .................. 2-168039

[51] Int. Cl.$^5$ ................................. C09K 3/00
[52] U.S. Cl. ..................... 106/287.16; 106/287.14; 106/287.19; 501/12; 556/435; 556/483
[58] Field of Search ............... 106/287.14, 287.16, 106/287.19; 501/12; 556/435, 483

[56] References Cited

U.S. PATENT DOCUMENTS

| | | | |
|---|---|---|---|
| 3,118,841 | 1/1964 | Moreton | 556/483 |
| 3,336,352 | 8/1967 | Omietanski | 556/435 |
| 3,395,036 | 7/1968 | Campbell | 106/287.14 |
| 4,028,085 | 6/1977 | Thomas | 501/12 |
| 4,278,632 | 7/1981 | Yoldas | 501/12 |
| 4,394,177 | 7/1983 | Fujioka et al. | 106/287.14 |
| 4,432,112 | 12/1983 | Luthringshauser et al. | 106/287.16 |
| 4,681,636 | 7/1987 | Saito et al. | 106/287.16 |
| 4,772,675 | 9/1988 | Klosowski et al. | 556/435 |

FOREIGN PATENT DOCUMENTS

| | | | |
|---|---|---|---|
| 59-025310 | 2/1984 | Japan | 556/435 |
| 63-135462 | 6/1988 | Japan | 106/287.16 |

Primary Examiner—David Brunsman
Attorney, Agent, or Firm—Oblon, Spivak, McClelland, Maier & Neustadt

[57] ABSTRACT

A primer composition comprises (A) an organosilicon compound having different alkoxy groups in its molecule, (B) a tetraalkoxytitanium, (C) an acid and water, and (D) an organic solvent. The composition shows excellent adhesion properties to fluororesin coating materials, acrylic resin coating materials, etc. When applied to the surface of a metal coated with such a coating material, the primer composition is capable of providing a remarkably enhanced adhesion, for example, between a silicone elastomer and the coated metal.

10 Claims, No Drawings

PRIMER COMPOSITIONS

BACKGROUND OF THE INVENTION

1. Field of the Invention

This invention relates to primer compositions, and more particularly to primer compositions effective in enhancing the adhesion between a condensation type room temperature curable silicone elastomer and a coated metal.

2. Description of the Prior Art

Condensation type room temperature curable silicone elastomers are, in general, to some extent adhesive to metals. In practical use of the silicone elastomers, however, the metal surface is treated with a primer, before being coated. As a primer for such purpose, there has been known a primer containing a silane or a silicone resin which is a cohydrolytic condensation product of silane. Also, U.S. Pat. No. 483,945 discloses a titanoorganosilane compound and gives a description that the compound can be used as a primer. It is further described that the organosilane to be used is a tri- or tetra-alkoxysilane having the following formula:

$$R'_{4-x}Si(OR)_x$$

wherein R and R' are each a monovalent hydrocarbon group, and x is 3 or 4, and that tri- or tetra-alkoxysilanes of the above formula are those in which all the alkoxy groups (OR) in the number of x are the same, and R' is a methacryloxypropyl group.

At present, coated metals are extensively used as outer walling material for buildings, in view of weatherability, appearance, etc., and coating materials based on fluororesin, urethane resin, acrylic resin or the like are used for the coating of metals. Condensation type room temperature curable silicone elastomers do not show good adhesion properties to metal substrates coated with the above coating materials, and the adhesion properties cannot be improved by use of a conventionally known primer. For instance, the primer disclosed in the aforementioned U.S. patent also does not exhibit good adhesion properties to coating materials based on fluororesin, urethane resin, acrylic resin or the like.

SUMMARY OF THE INVENTION

Accordingly it is an object of this invention to provide a primer composition which affords excellent adhesion to metals coated with a coating material based on fluororesin, urethane resin, acrylic resin or the like.

According to this invention, there is provided a primer composition comprising:

(A) at least one organosilicon compound selected from the group consisting of:

organosilicon compounds having the following general formula [I]:

$$(R^1O)_bSi(OR^2)_{4-a-b} \overset{R_a^3}{|} \quad [I]$$

wherein $R^1$ and $R^2$ are each a substituted or unsubstituted alkyl groups and are different from each other, $R^3$ is a substituted or unsubstituted monovalent hydrocarbon group, a is 0 or 1, and b is 1 or 2, organosilicon compounds having the following general formula [II]:

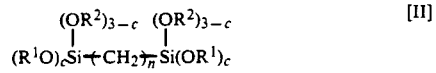

wherein c is 1 or 2, n is a positive integer, and $R^1$ and $R^2$ are as defined above, organosilicon compounds having the following general formula [III]:

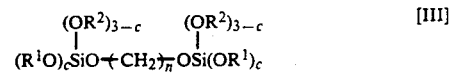

wherein $R^1$, $R^2$, c and n are as defined above, and partially hydrolyzed products of these organosilicon compounds;

(B) at least one compound selected from the group consisting of an alkoxytitanium, a partially hydrolyzed product thereof and a cohydrolytic condensation product of the same;

(C) an acid and water; and (D) an organic solvent.

The primer composition according to this invention has a distinguishing feature in that an organosilicon compound having at least two different alkoxy groups or a partially hydrolyzed product of the compound is contained in the composition. The primer composition shows excellent adhesion properties to a variety of coated metals. For example, when the primer composition is used for adhesion between a condensation type room temperature curable silicone elastomer and a coated metal, the primer composition affords such a strong adhesion that a pull on the elastomer, for peeling, will result in rubber gum failure throughout the adhered portion. This is probably because a titanosiloxane is formed through hydrolysis of the components (A) to (C), making a great contribution to improvement of the adhesion to the coating on the metal.

It is thus possible, according to this invention, to achieve satisfactory adhesion between a coated metal and a condensation type room temperature curable silicone elastomer. The primer composition of the invention is therefore extremely useful industrially.

DETAILED DESCRIPTION OF THE INVENTION

Component (A)

The organosilicon compound for use as component (A) in this invention is selected from organosilicon compounds having the aforementioned general formula [I], [II] or [III] and partially hydrolyzed products thereof.

In the general formulas [I] to [III], the substituted or unsubstituted monovalent hydrocarbon groups $R^3$ are preferably those having up to 18 carbon atoms, more preferably those of up to 10 carbon atoms, for example, alkyl groups such as methyl, ethyl, propyl, butyl, etc., cycloalkyl groups such as cyclohexyl, etc., aryl groups such as phenyl, tolyl, naphthyl, etc., aralkyl groups such as benzyl, 2-phenylethyl, etc., and groups derived from these groups by replacement of carbon-bonded hydrogen atoms by halogen atoms or the like, such as chloromethyl, 3,3,3-trifluoropropyl, 2-cyanoethyl, and so on. Of the above groups, particularly preferred are methyl and phenyl groups.

The substituted or unsubstituted alkyl groups $R^1$ and $R^2$ include, for example, alkyl groups of up to 10 carbon atoms, preferably up to 6 carbon atoms, such as methyl, ethyl, propyl, butyl, etc., and groups derived from these groups by replacement of carbon-bonded hydrogen atoms by halogen atoms, lower alkoxy groups or the like, such as 3,3,3-trifluoropropyl, methoxymethyl, ethoxymethyl, methoxyethyl, ethoxyethyl, and so on. As has been stated above, the group $R^1$ and the group $R^2$ are different from each other. If an organosilicon compound in which the groups $R^1$ and $R^2$ are the same is used, it is impossible to obtain the adhesion-improving effect intended.

In the organosilicon compounds corresponding to the general formulas [II] and [III], each n is a positive integer, preferably an integer of from 1 to 6.

Typical examples of the organosilicon compounds corresponding to the general formulas [I] to [III] are as follows.

Organosilicon compounds of general formula [I]:
t-BuOSi(OMe)$_3$, (t-BuO)$_2$Si(OMe)$_2$, (t-BuO)$_3$SiOMe, n-BuOSi(OMe)$_3$, (n-BuO)$_2$Si(OMe)$_2$, (n-BuO)$_3$SiOMe, i-BuOSi(OMe)$_3$, (i-BuO)$_2$Si(OMe)$_2$, (i-BuO)$_3$SiOMe, i-C$_3$H$_7$OSi(OMe)$_3$, (i-C$_3$H$_7$O)$_2$Si(OMe)$_2$, (i-C$_3$H$_7$O)$_3$SiOMe, n-C$_3$H$_7$OSi(OMe)$_3$, (n-C$_3$H$_7$O)$_2$Si(OMe)$_2$, (n-C$_3$H$_7$O)$_3$SiOMe, EtOSi(OMe)$_3$, (EtO)$_2$Si(OMe)$_2$, (EtO)$_3$SiOMe, n-C$_8$H$_{17}$OSi(OMe)$_3$, (n-C$_8$H$_{17}$O)$_2$Si(OMe)$_2$,

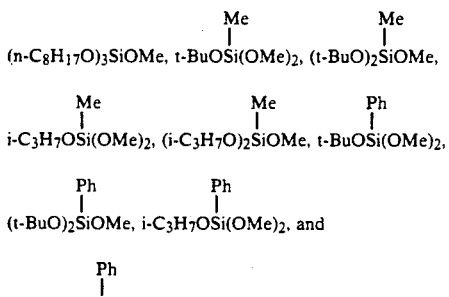

Organosilicon compounds of general formula [II]:

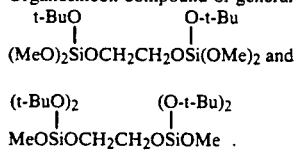

Organosilicon compound of general formula [III]:
$$\begin{array}{cc} \text{t-BuO} & \text{O-t-Bu} \\ | & | \end{array}$$
(MeO)$_2$SiOCH$_2$CH$_2$OSi(OMe)$_2$ and $$\begin{array}{cc} \text{(t-BuO)}_2 & \text{(O-t-Bu)}_2 \\ | & | \end{array}$$
MeOSiOCH$_2$CH$_2$OSiOMe .

In the above formulas, Me stands for the methyl group, Et for the ethyl group, Bu for the butyl group, and Ph for the phenyl group.

These organosilicon compounds may be used either singly or in combination of two or more, and may also be used in the form of a partially hydrolyzed product thereof.

In this invention, the organosilicon compound is generally used in an amount of preferably from 1 to 30% by weight, more preferably from 5 to 10% by weight, based on the primer composition.

Component (B)

In the primer composition of this invention, at least one compound of an alkoxytitanium and a partially hydrolyzed product thereof is used as component (B).

As the alkoxytitanium, for example, a tetraalkoxytitanium having the following general formula [IV]:

$$\text{Ti(OR}^4)_4 \qquad \text{[IV]}$$

wherein $R^4$ is a substituted or unsubstituted alkyl group, is used preferably.

In the general formula [IV], the substituted or unsubstituted alkyl group $R^4$ includes those of generally up to 12 carbon atoms, preferably up to 10 carbon atoms, for example, alkyl groups of up to 12 carbon atoms such as methyl, ethyl, propyl, butyl, etc., and groups derived from these alkyl groups by substitution of halogen atoms, lower alkoxy groups or the like for some or all of the hydrogen atoms in these alkyl groups. The most preferable examples of the alkoxytitanium include tetraethoxytitanium, tetrapropoxytitanium and tetraisopropoxytitanium.

The alkoxytitaniums may be used either singly or in combination of two or more, and may also be used in the form of a partially hydrolyzed product thereof. Further, the alkoxytitaniums can be used in the form of a cohydrolytic condensation product thereof.

The component (B) as above is generally used in an amount of preferably from 10 to 1,000 parts by weight, more preferably from 50 to 200 parts by weight, per 100 parts by weight of the component (A).

Component (C)

In the primer composition of this invention, an acid and water are used as component (C). This component is for accelerating the hydrolysis of the components (A) and (B) and for formation of a titanosilicate, which contributes to improvement of adhesion properties.

The acids which can be used include, for example, inorganic acids such as hydrochloric acid, sulfuric acid, nitric acid, phosphoric acid, etc., and organic acids such as acetic acid, trifluoromethanesulfonic acid, etc. These acids are generally used in an amount of preferably from 0.01 to 500 parts by weight, more preferably from 0.1 to 100 parts by weight, per 100 parts by weight of the component (A).

The water is generally used in an amount of preferably from 0.01 to 500 parts by weight, more preferably from 0.1 to 100 parts by weight, per 100 parts by weight of the component (A).

Component (D)

In the primer composition of this invention, an organic solvent is used as component (D), in order to dissolve each component incorporated in the composition, thereby forming a uniform composition.

The organic solvent may be any one that is capable of dissolving the components (A) and (B) in any proportions and has satisfactory volatility at room temperature. Specific, but nonlimitative, examples of the organic solvent which can be used include aromatic solvents such as benzene, toluene, xylene, etc., alcoholic solvents such as methanol, ethanol, isopropyl alcohol, butanol, ethylene glycol monomethyl ether, diethyl ketone, cyclohexanone, etc., ketone solvents such as acetone, methyl ethyl ketone, etc., hydrocarbon solvents such as ligroin, heptane, hexane, cyclohexane, etc., and ether solvents such as tetrahydrofuran, dioxane, and so on.

These organic solvent are used generally in such an amount as to bring the proportion of the component (A) in the primer composition to within the aforementioned range. For example, the amount of the organic solvent is preferably from 10 to 96%, more preferably from 80 to 90% by weight, based on the primer composition.

Other compounding ingredients

In addition to the above components, the primer composition of this invention may further comprise other compounding ingredients such as silane coupling agents, silicone resins, etc., unless the object of this invention is spoiled.

Primer composition

The primer composition according to this invention can be prepared easily by mixing together the aforementioned components, optionally with other compounding ingredients. To attain a more excellent adhesion-improving effect, however, it is preferable to heat the composition in the temperature range of 50° to 60° C. for 1 to 3 hours, after the mixing of the components. The heating causes the organosilicon compound of component (A) and the alkoxytitanium of component (B) to react, at least in part, with each other to form a titanosilicate, resulting in an increase in the adhesion-improving effect.

The primer composition of this invention is especially useful for enhancing the adhesion between a silicone elastomer and a coated metal surface. For instance, the primer composition exhibits an excellent adhesion-improving effect on coated metals, even where the coating material is based on fluororesin, urethane resin, acrylic resin or the like. The primer composition will form a primer film when applied by a brush, spray, roll or the like to a coated metal surface which has been cleaned by an appropriate method.

EXAMPLES

Example 1, Comparative Examples 1–4

In a mixed solution of 5.0 g of hexane and 50.0 g of isopropyl alcohol were dissolved 2.5 g of di-t-butoxydimethoxysilane, 2.7 g of tetrapropoxytitanium and 0.5 g of a 36% aqueous solution of hydrochloric acid, to prepare a primer composition (Example 1).

Also, primer compositions were prepared in the same manner as in Example 1 except for omitting one of the di-t-butoxydimethoxysilane, tetrapropoxytitanium and aqueous hydrochloric acid solution, as shown in Table 1 below (Comparative Examples 1, 2 and 3).

A further primer composition was prepared in the same manner as in Example 1 except for using 2.5 g of tetremethoxysilane in place of the di-t-butoxydimethoxysilane (Comparative Example 4).

Two coated metal plates, coated respectively with a fluororesin coating material and an acrylic resin coating material, were prepared as adherends. After cleaning the surface of each coated metal plate with toluene, each of the primer compositions obtained as above was applied to the cleaned surface by brush coating, in a small thickness, followed by drying to form a primer film.

A room temperature condensation type silicone elastomer composition, which releases N,N-diethylhydroxylamine, was applied to the surface of each of the primer films obtained above, and was cured. After 14 days, the adhesion properties between the cured silicone elastomer and the coated metal were tested according to the method as specified in JIS-A578. The results are shown in Table 2.

TABLE 1

| Components of primer composition (unit:g) | Example 1 | Comparative Examples | | | |
|---|---|---|---|---|---|
| | | 1 | 2 | 3 | 4 |
| Di-t-butoxydimethoxysilane | 2.5 | 0 | 2.5 | 2.5 | 0 |
| Tetrapropoxytitanium | 2.7 | 2.7 | 0 | 2.7 | 2.7 |
| Tetramethoxysilane | 0 | 0 | 0 | 0 | 2.5 |
| 36% aq. soln. of HCl | 0.5 | 0.5 | 0.5 | 0 | 0.5 |
| Hexane | 5.0 | 5.0 | 5.0 | 5.0 | 5.0 |
| Isopropyl alcohol | 50.0 | 50.0 | 50.0 | 50.0 | 50.0 |

TABLE 2

| Example and Comparative Examples | Fluororesin-coated metal | | Acrylic resin-coated metal | |
|---|---|---|---|---|
| | elastomer cohesive failure | interfacial failure | elastomer cohesive failure | interfacial failure |
| Example 1 | 100% | — | 100% | — |
| Comp. Ex. | | | | |
| 1 | — | 100% | — | 100% |
| 2 | — | 100% | — | 100% |
| 3 | — | 100% | — | 100% |
| 4 | — | 100% | — | 100% |

As is seen from the above results, the use of the primer composition obtained in Example 1 led to 100% elastomer failure for the coated metals which were coated with either a fluororesin coating material or an acrylic resin coating material. Where the primer compositions obtained in Comparative Examples 1 to 4 were used, on the other hand, 100% interfacial failure took place for the metals coated with either a fluororesin coating material or an acrylic resin coating material.

Example 2, Comparative Example 5

A mixture of 1.2 g of t-butoxytrimethoxysilane, 1.3 g of gamma-methacryloxypropyl trimethoxysilane, 2.8 g of tetrabutoxytitanium, 0.2 g of trifluoromethanesulfonic acid, 0.5 g of water and 70 g of isopropanol was reacted at 50° to 60° C. for 3 hours, to give a primer composition (Example 2).

Also, a primer composition was prepared in the same manner as in Example 2 except that t-butoxytrimethoxysilane was not used (Comparative Example 5).

The primer compositions obtained as above were tested for adhesion properties, similarly to Example 1, by using fluororesin-coated metal plates, acrylic resin electrodeposited metal plates and urethane resin-coated metal plates as adherends. The primer composition of Example 2 resulted in 100% elastomer cohesive failure, indicating good adhesive strength, for all the adherends. The primer composition of Comparative Example 5, on the other hand, led to 100% interfacial failure, indicat-

We claim:

1. A primer composition comprising:
    (A) at least one organosilicon compound selected from the group consisting of:
    organosilicon compounds having the following general formula [II]:

$$\overset{(OR^2)_{3-c}}{\underset{|}{(R^1O)_c Si}} \text{—} (CH_2)_n \overset{(OR^2)_{3-c}}{\underset{|}{Si(OR^1)_c}} \quad [II]$$

wherein c is 1 or 2, n is a positive integer, and $R^1$ and $R^2$ are as defined above, and
    organosilicon compounds having the following general formula [III]:

$$\overset{(OR^2)_{3-c}}{\underset{|}{(R^1O)_c SiO}} \text{—} (CH_2)_n \text{—} \overset{(OR^2)_{3-c}}{\underset{|}{OSi(OR^1)_c}} \quad [III]$$

wherein $R^1$, $R^2$, c and n are as defined above, and partially hydrolyzed products of these organosilicon compounds;
    (B) at least one compound selected from the group consisting of an alkoxytitanium, a partially hydrolyzed product thereof and a cohydrolytic condensation product of the same;
    (C) an acid and water; and
    (D) an organic solvent.

2. The primer composition according to claim 1 wherein the groups $R^1$ and $R^2$ in the general formulas [II] or [III] are each an alkyl group of up to 10 carbon atoms or a group derived from said alkyl group by substitution of a halogen atom or alkoxyl group for part of the hydrogen atoms in said alkyl group.

3. The primer composition according to claim 1, wherein the component (A) comprises, as the compound of the general formula [II], at least one selected from the group consisting of:

$$\overset{t\text{-}BuO}{\underset{|}{(MeO)_2SiCH_2CH_2Si(OMe)_2}}\overset{O\text{-}t\text{-}Bu}{\underset{|}{,}} \overset{(t\text{-}BuO)_2}{\underset{|}{MeOSiCH_2CH_2SiOMe}}\overset{(O\text{-}t\text{-}Bu)_2}{\underset{|}{,}}$$

$$\overset{i\text{-}C_3H_7O}{\underset{|}{(MeO)_2SiCH_2CH_2Si(OMe)_2}}\overset{i\text{-}C_3H_7O}{\underset{|}{,}} \overset{(i\text{-}C_3H_7O)_2}{\underset{|}{MeOSiCH_2CH_2SiOMe}}\overset{(O\text{-}i\text{-}C_3H_7)_2}{\underset{|}{,}}$$

$$\overset{t\text{-}BuO}{\underset{|}{(MeO)_2SiCH_2Si(OMe)_2}}\overset{O\text{-}t\text{-}Bu}{\underset{|}{,}} \overset{(t\text{-}BuO)_2}{\underset{|}{MeOSiCH_2CH_2SiOMe}}\overset{(O\text{-}t\text{-}Bu)_2}{\underset{|}{,}}$$

$$\overset{i\text{-}C_3H_7O}{\underset{|}{(MeO)_2SiCH_2Si(OMe)_2}}\overset{O\text{-}i\text{-}C_3H_7}{\underset{|}{,}} \text{ and}$$

$$\overset{(i\text{-}C_3H_7O)_2}{\underset{|}{MeOSiCH_2SiOMe}}\overset{(O\text{-}i\text{-}C_3H_7)_2}{\underset{|}{.}}$$

4. The primer composition according to claim 1, wherein the component (A) comprises, as the compound of the general formula [III], at least one of $$\overset{t\text{-}BuO}{\underset{|}{(MeO)_2SiOCH_2CH_2OSi(OMe)_2}}\overset{O\text{-}t\text{-}Bu}{\underset{|}{}}$$

and $$\overset{(t\text{-}BuO)_2}{\underset{|}{MeOSiOCH_2CH_2OSiOMe}}\overset{(O\text{-}t\text{-}Bu)_2}{\underset{|}{.}}$$

5. The primer composition according to claim 1, wherein the organosilicon compound of the component (A) is contained in an amount of from 1 to 30% by weight.

6. The primer composition according to claim 5, wherein the component (B) is used in an amount of from 10 to 1,000 parts by weight per 100 parts by weight of the component (A).

7. The primer composition according to claim 5, wherein the acid in component (C) is present in an amount of from 0.01 to 500 parts by weight per 100 parts by weight of the component (A), and the water in component (C) is present in an amount of from 0.01 to 500 parts by weight per 100 parts by weight of the component (A).

8. The primer composition according to claim 1, said alkoxytitanium of the component (B) comprises a tetraalkoxytitanium having the general formula [IV]:

$$Ti(OR^4)_4 \quad [IV]$$

wherein $R^4$ is a substituted or unsubstituted alkyl group.

9. The primer composition according to claim 8, wherein the tetraalkoxytitanium is tetraethoxytitanium, tetrapropoxytitanium or tetraisopropoxytitanium.

10. The primer composition according to claim 1, wherein the acid in the component (C) comprises at least one acid selected from the group consisting of hydrochloric acid, sulfuric acid, nitric acid, phosphoric acid, acetic acid and trifluoromethanesulfonic acid.

* * * * *